(12) United States Patent
Lieberman

(10) Patent No.: US 7,670,006 B2
(45) Date of Patent: Mar. 2, 2010

(54) SYSTEM AND METHOD FOR PROJECTION

(75) Inventor: Klony Lieberman, Jerusalem (IL)

(73) Assignee: VKB Inc., Wilmington, DE (US)

( * ) Notice: Subject to any disclaimer, the term of this patent is extended or adjusted under 35 U.S.C. 154(b) by 1044 days.

(21) Appl. No.: 11/360,854

(22) Filed: Feb. 23, 2006

(65) Prior Publication Data

US 2006/0187199 A1 Aug. 24, 2006

Related U.S. Application Data

(60) Provisional application No. 60/655,409, filed on Feb. 24, 2005, provisional application No. 60/709,042, filed on Aug. 18, 2005.

(51) Int. Cl.
*G03B 21/14* (2006.01)

(52) U.S. Cl. ........................................................ 353/70

(58) Field of Classification Search .................. 353/69, 353/70

See application file for complete search history.

(56) References Cited

U.S. PATENT DOCUMENTS

| | | | |
|---|---|---|---|
| 4,561,017 A | 12/1985 | Greene | |
| 5,181,108 A | 1/1993 | Greene | |
| 5,557,353 A * | 9/1996 | Stahl | 353/69 |
| 5,781,252 A | 7/1998 | Gale | |
| 5,952,731 A | 9/1999 | McPherson et al. | |
| 6,218,967 B1 | 4/2001 | Maula | |
| 6,281,878 B1 | 8/2001 | Montellese | |
| 6,297,894 B1 | 10/2001 | Miller et al. | |
| 6,354,707 B1 * | 3/2002 | Jeon et al. | 353/69 |
| 6,367,933 B1 * | 4/2002 | Chen et al. | 353/69 |
| 6,520,647 B2 * | 2/2003 | Raskar | 353/70 |
| 6,607,277 B2 | 8/2003 | Yokoyama et al. | |
| 6,611,252 B1 | 8/2003 | Dufaux | |
| 6,614,422 B1 | 9/2003 | Rafii et al. | |

(Continued)

FOREIGN PATENT DOCUMENTS

EP 1 039 365 9/2000

(Continued)

OTHER PUBLICATIONS

Leibe, at al., "Toward spontaneous interaction with the perceptive workbench", IEEE computer graphics and applications, IEEE service center, New York, NY vol. 20, No. 6, Nov. 2000, pp. 54-64.

(Continued)

*Primary Examiner*—William C. Dowling
(74) *Attorney, Agent, or Firm*—Ladas and Parry LLP

(57) ABSTRACT

A pattern projector including a source of light to be projected, a spatial light modulator arranged in a spatial light modulator plane, the spatial light modulator receiving the light from the source of light and being configured to pass the light therethrough in a first pattern and projection optics receiving the light from the spatial light modulator and being operative to project a desired second pattern onto a projection surface lying in a projection surface plane which is angled with respect to the spatial light modulator plane, the first pattern being a distortion of the desired second pattern configured such that keystone distortions resulting from the difference in angular orientations of the spatial light modulator plane and the projection surface plane are compensated.

12 Claims, 8 Drawing Sheets

U.S. PATENT DOCUMENTS

| | | |
|---|---|---|
| 6,690,354 B2 | 2/2004 | Sze |
| 6,690,357 B1 | 2/2004 | Dunton et al. |
| 6,854,870 B2 | 2/2005 | Huizenga |
| 7,151,530 B2 | 12/2006 | Roeber et al. |
| 7,215,327 B2 | 5/2007 | Liu et al. |
| 7,230,611 B2 | 6/2007 | Bischoff |
| 7,242,388 B2 | 7/2007 | Lieberman et al. |
| 7,248,151 B2 | 7/2007 | Mc Call |
| 7,352,913 B2 * | 4/2008 | Karuta et al. ............ 382/275 |
| 2003/0132921 A1 | 7/2003 | Torunoglu et al. |
| 2004/0046744 A1 | 3/2004 | Rafii et al. |
| 2004/0150797 A1 * | 8/2004 | Rieche et al. ............ 353/69 |
| 2005/0169527 A1 | 8/2005 | Longe et al. |
| 2006/0101349 A1 | 5/2006 | Lieberman et al. |
| 2006/0187198 A1 * | 8/2006 | Lieberman ............ 345/156 |
| 2006/0190836 A1 | 8/2006 | Ling Su et al. |

FOREIGN PATENT DOCUMENTS

| | | |
|---|---|---|
| FR | 2 756 077 | 5/1998 |
| WO | WO 01/59975 | 8/2001 |

OTHER PUBLICATIONS

Supplementary European Search Report dated Aug. 14, 2007 for European Application No. EP 01 27 2779..

* cited by examiner

SYSTEM AND METHOD FOR PROJECTION

REFERENCE TO RELATED APPLICATIONS

Reference is made to U.S. Provisional Patent Application No. 60/655,409, entitled DISTANCE MEASUREMENT TECHNIQUE FOR VIRTUAL INTERFACES, filed Feb. 24, 2005, and to U.S. Provisional Patent Application No. 60/709,042, entitled APPARATUS FOR LOCATING AN INTERACTION IN TWO DIMENSIONS, filed Aug. 18, 2005, the disclosures of which are hereby incorporated by reference and priority of which is hereby claimed pursuant to 37 CFR 1.78(a) (4) and (5)(i).

FIELD OF THE INVENTION

The present invention relates to data entry devices generally.

BACKGROUND OF THE INVENTION

The following patent publications are believed to represent the current state of the art:

U.S. Pat. Nos. 6,351,260; 6,761,457; 4,782,328; 6,690,363 and 6,281,878;

U.S. Patent Application Publication Numbers: 2005/271319 and 2005/190162; and

PCT Patent Publication Numbers: WO04/023208; WO05/043231; WO04/003656 and WO02/054169.

SUMMARY OF THE INVENTION

The present invention seeks to provide an improved data entry device.

There is thus provided in accordance with a preferred embodiment of the present invention a virtual data entry device including an illuminator generating a generally planar beam of light and an impingement sensor assembly operative to sense at least one location of impingement of the planar beam of light by at least one object, the impingement sensor assembly including at least one optical element arranged to receive light from the planar beam reflected by the at least one object, the at least one optical element having optical power in a first direction such that it focuses light at at least one focus line location, which the at least one focus line location is a function of the location of the at least one object relative to the at least one optical element and a multi-element detector arranged to receive light passing through the at least one optical element, wherein the distribution of the light detected by the multi-element detector among multiple elements thereof indicates the location of the at least one object.

In accordance with a preferred embodiment of the present invention the at least one optical element has optical power in a second direction which is at least one of zero or substantially different from the optical power in the first direction. Preferably, the at least one optical element is at least one of a cylindrical lens, a conical lens and a torroidal lens.

In accordance with another preferred embodiment of the present invention the multi-element detector has multiple elements arranged side-by-side along a detector line which intersects the at least one focus line, wherein the location of intersection of the at least one focus line and the detector line indicates distance of the at least one object from the at least one optical element. Additionally or alternatively, the multi-element detector has multiple elements arranged side-by-side along a detector line which intersects the at least one focus line, wherein the location of intersection of the at least one focus line and the detector line indicates azimuthal location of the at least one object from the at least one optical element. As a further alternative, the multi-element detector has multiple elements arranged side-by-side in two dimensions in a plane which intersects the at least one focus line, whereby the location of intersection of the at least one focus line on the multi-element detector indicates the location of the at least one object in two-dimensions.

In accordance with still another preferred embodiment of the present invention the at least one multi-element detector comprises a first multi-element detector and a second multi-element detector and the at least one optical element comprises a first optical element and a second optical element, the first multi-element detector having multiple elements arranged side-by-side along a first detector line which intersects the at least one focus line, wherein the location of intersection of the at least one focus line and the first detector line indicates azimuthal location of the at least one object from the first optical element and the second multi-element detector having multiple elements arranged side-by-side along a second detector line which intersects the at least one focus line, wherein the location of intersection of the at least one focus line and the second detector line indicates distance of the at least one object from the second optical element.

In accordance with yet another preferred embodiment of the present invention the multi-element detector includes a generally one-dimensional slit lying in the second plane along a detector line which intersects the at least one focus line, wherein the location of intersection of the at least one focus line and the detector line indicates distance of the at least one object from the at least one optical element. Preferably, the generally planar beam of light is spaced from and generally parallel to a generally planar display surface. More preferably, the generally planar display surface includes an LCD screen.

In accordance with still another preferred embodiment of the present invention the virtual data entry device also includes processing circuitry operative to receive at least one output signal of the multi-element detector and to determine the location of the at least one object.

There is further provided in accordance with a further preferred embodiment of the present invention a virtual data entry device including an illuminator generating a generally planar beam of light generally parallel to a generally flat surface which is at least partially light reflecting and an impingement sensor assembly operative to sense at least one location of impingement of the planar beam of light by at least one object, the impingement sensor assembly including at least one optical element arranged to receive light from the planar beam reflected by the at least one object directly and indirectly via the surface and a two-dimensional multi-element detector arranged to receive light passing through the at least one optical element, wherein the spatial separation on the detector of the light detected by the multi-element detector which was reflected directly from the at least one object and the light which was reflected via the light reflecting surface thereof indicates distance of the at least one object from the at least one optical element and location on the detector of the light reflected directly and indirectly from the at least one object indicates the azimuthal location of the at least one object relative to the at least one optical element.

In accordance with a preferred embodiment of the present invention the generally flat light reflecting surface includes an LCD screen. Preferably, the virtual data entry device also includes processing circuitry operative to receive at least one output signal of the multi-element detector and to determine at least one of the distance of the at least one object from the at least one optical element and the azimuthal location of the at least one object relative to the at least one optical element. Additionally or alternatively, the processing circuitry is operative to output the location of the at least one object in Cartesian coordinates.

There is additionally provided in accordance with an additional preferred embodiment of the present invention a pattern projector including a source of light to be projected, a spatial light modulator arranged in a spatial light modulator plane, the spatial light modulator receiving the light from the source of light and being configured to pass the light therethrough in a first pattern and projection optics receiving the light from the spatial light modulator and being operative to project a desired second pattern onto a projection surface lying in a projection surface plane which is angled with respect to the spatial light modulator plane, the first pattern being a distortion of the desired second pattern configured such that keystone distortions resulting from the difference in angular orientations of the spatial light modulator plane and the projection surface plane are compensated.

In accordance with a preferred embodiment of the present invention the pattern projector also includes a collimator interposed between the source of light and the spatial light modulator, the collimator being operative to distribute the light from the source of light across the spatial light modulator in a non-uniform distribution such that light distribution in the desired second pattern has uniformity greater than the non-uniform distribution. Preferably, the spatial light modulator includes an LCD. More preferably, the LCD is a matrix LCD. Alternatively, the LCD is a segmented LCD.

In accordance with another preferred embodiment of the present invention the spatial light modulator plane is angled with respect to the projection optics such that the desired second pattern is focused to a generally uniform extent. Preferably, the spatial light modulator includes a plurality of pixels, different ones of the plurality of pixels of the spatial light modulator having different sizes. Alternatively, different ones of the plurality of pixels of the spatial light modulator have different shapes.

In accordance with yet another preferred embodiment of the present invention the spatial light modulator plane is angled with respect to the projection optics such that the desired second pattern is focused to a generally uniform extent. Preferably, the spatial light modulator includes a plurality of segments, different ones of the plurality of segments of the spatial light modulator having different sizes. Alternatively, different ones of the plurality of segments of the spatial light modulator have different shapes.

There is also provided in accordance with yet another preferred embodiment of the present invention a method for data entry including utilizing an illuminator to generate a generally planar beam of light and sensing at least one location of impingement of the planar beam of light by at least one object, using an impingement sensor assembly including at least one optical element arranged to receive light from the planar beam reflected by the at least one object, the at least one optical element having optical power in a first direction such that it focuses light at at least one focus line location, which the at least one focus line location is a function of the location of the at least one object relative to the at least one optical element and a multi-element detector arranged to receive light passing through the at least one optical element, wherein the distribution of the light detected by the multi-element detector among multiple elements thereof indicates the location of the at least one object.

In accordance with another preferred embodiment of the present invention the method for data entry also includes determining the distance of the at least one object from the at least one optical element by determining a location of intersection between the at least one focus line and a detector line along which are arranged, in a side-by-side orientation, multiple elements of the multi-element detector. Additionally or alternatively, the method for data entry also includes determining the azimuthal location of the at least one object with respect to the at least one optical element by determining a location of intersection between the at least one focus line and a detector line along which are arranged, in a side-by-side orientation, multiple elements of the multi-element detector. As a further alternative, the method for data entry also includes determining the location of the at least one object in two-dimensions by determining a location of intersection between the at least one focus line and a detector plane along which are arranged, in a side-by-side two-dimensional orientation, multiple elements of the multi-element detector.

In accordance with still another preferred embodiment of the present invention the at least one multi-element detector comprises a first multi-element detector and a second multi-element detector and the at least one optical element comprises a first optical element and a second optical element, the method also including determining the azimuthal location of the at least one object with respect to the first optical element by determining a location of intersection between the at least one focus line and a first detector line along which are arranged, in a side-by-side orientation, multiple elements of the first multi-element detector and determining the distance of the at least one object from the second optical element by determining a location of intersection between the at least one focus line and a second detector line along which are arranged, in a side-by-side orientation, multiple elements of the second multi-element detector.

In accordance with another preferred embodiment of the present invention the method of data entry also includes providing processing circuitry for receiving at least one output signal of the multi-element detector and determining the location of the at least one object.

There is yet further provided in accordance with yet another preferred embodiment of the present invention a method for data entry including utilizing an illuminator for generating a generally planar beam of light generally parallel to a generally flat surface which is at least partially light reflecting and sensing at least one location of impingement of the planar beam of light by at least one object, using an impingement sensor assembly including at least one optical element arranged to receive light from the planar beam reflected by the at least one object directly and indirectly via the surface and a two-dimensional multi-element detector arranged to receive light passing through the at least one optical element, wherein the spatial separation on the detector of the light detected by the multi-element detector which was reflected directly from the at least one object and the light which was reflected via the light reflecting surface thereof indicates distance of the at least one object from the at least one optical element and location on the detector of the light reflected directly and indirectly from the at least one object indicates the azimuthal location of the at least one object relative to the at least one optical element.

In accordance with a preferred embodiment of the present invention the method for data entry also includes providing processing circuitry for receiving at least one output signal of the multi-element detector and for determining at least one of the distance of the at least one object from the at least one optical element and the azimuthal location of the at least one object relative to the at least one optical element. Additionally or alternatively, the providing processing circuitry also includes providing processing circuitry for outputting the location of the at least one object in Cartesian coordinates.

There is additionally provided in accordance with another preferred embodiment of the present invention a method for projecting a pattern including providing a source of light to be projected, arranging a spatial light modulator, in a spatial light modulator plane, to receive the light from the source of light, the spatial light modulator being configured to pass the light therethrough in a first pattern and using projection optics for receiving the light from the spatial light modulator and for projecting a desired second pattern onto a projection surface lying in a projection surface plane which is angled with respect to the spatial light modulator plane, the first pattern being a distortion of the desired second pattern configured such that keystone distortions resulting from the difference in angular orientations of the spatial light modulator plane and the projection surface plane are compensated.

In accordance with a preferred embodiment of the present invention the method for projecting a pattern also includes providing a collimator interposed between the source of light and the spatial light modulator, and utilizing the collimator to distribute the light from the source of light across the spatial light modulator in a non-uniform distribution such that light distribution in the desired second pattern has uniformity greater than the non-uniform distribution. Preferably, the arranging the spatial light modulator includes angling the spatial light modulator plane with respect to the projection optics such that the desired second pattern is focused to a generally uniform extent.

In accordance with another preferred embodiment of the present invention the arranging the spatial light modulator includes providing a spatial light modulator including a plurality of pixels, different ones of the plurality of pixels having different sizes. Alternatively, different ones of the plurality of pixels have different shapes.

In accordance with yet another preferred embodiment of the present invention the arranging the spatial light modulator includes providing a spatial light modulator including a plurality of segments, different ones of the plurality of segments having different sizes. Alternatively, different ones of the plurality of segments have different shapes.

BRIEF DESCRIPTION OF THE DRAWINGS

The present invention will be more fully understood and appreciated from the following detailed description, taken in conjunction with the drawings in which.

DETAILED DESCRIPTION OF PREFERRED EMBODIMENTS

Figure 1:
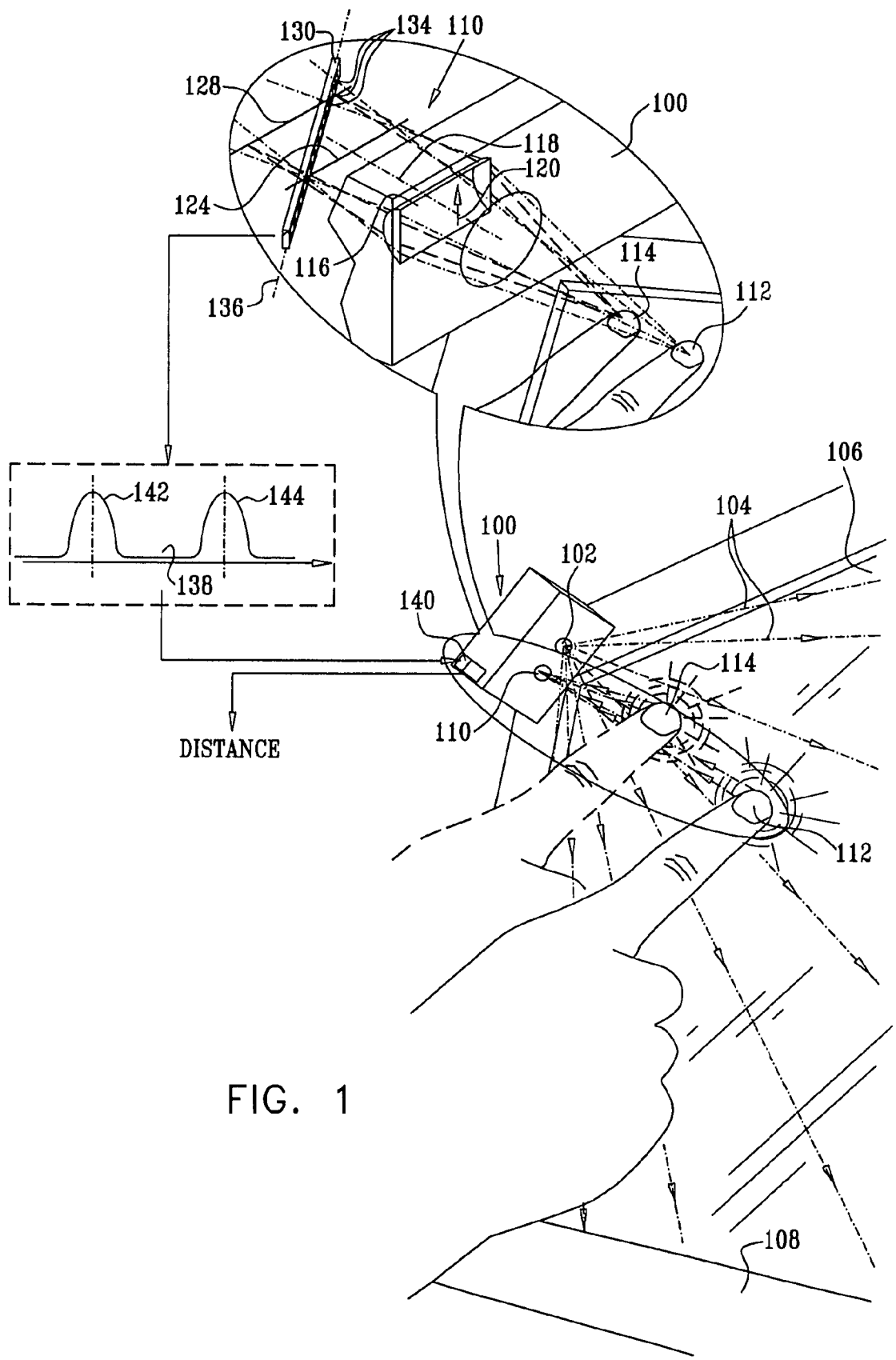
FIG. 1 is a simplified partially pictorial, partially diagrammatic illustration of a portion of a data entry device constructed and operative in accordance with a preferred embodiment of the present invention.

Reference is now made to FIG. 1, which is a simplified partially pictorial, partially diagrammatic illustration of a portion of a data entry device constructed and operative in accordance with a preferred embodiment of the present invention.

As seen in FIG. 1, there is provided a virtual data entry device, generally designated by reference numeral 100 and including an illuminator 102, generating a generally planar beam of light, generally designated by reference numeral 104. In the illustrated preferred embodiment of the invention, the generally planar beam of light 104 lies in spaced, generally parallel relationship to a generally planar surface 106 of a display 108, such as a LCD display.

An impingement sensor assembly 110 is operative to sense the distance of at least one location of impingement of the planar beam of light 104 by at least one object, such as a finger or a stylus. In the illustrated embodiment of FIG. 1, the planar beam of light 104 impinges on two fingers 112 and 114 which typically are touching display surface 106. The impingement sensor assembly 110 preferably includes at least one optical element, such as a cylindrical lens 116, having an optical axis 118 and arranged to receive light from planar beam 104 scattered or otherwise reflected by the fingers 112 and 114. Alternatively, a conical lens or a torroidal lens may be used.

Preferably, the optical element has optical power in a first direction 120, here perpendicular to display surface 106, thereby to focus light from finger 112 at a given focus line location 124, and to focus light from finger 114 at a given focus line location 128. The focus line locations 124 and 128 are each a function of the distance of respective fingers 112 and 114, which scatter light from planar beam 104, from the optical element 116.

A multi-element detector, preferably a one-dimensional detector 130, such as a linear CMOS or CCD array commercially available from Panavision LTD. of 6219 De Soto Avenue, Woodland Hills, Calif., typically including 2048 pixels arranged along a straight line wherein each pixel is generally square, is preferably inclined with respect to the optical element 116 and is arranged to receive light passing through the at least one optical element 116, wherein the distribution of light, detected by the multi-element detector 130, indicates the distance of each of fingers 112 and 114 from optical element 116.

It is a particular feature of the present invention that the multi-element detector 130 has multiple elements 134 arranged side-by-side along a detector line 136 which intersects the focus lines 124 and 128, wherein the location of intersection of each of focus lines 124 and 128 with the detector line 136 indicates the respective distances of fingers 112 and 114 from the optical element 116.

Detector 130 provides an output signal 138 which indicates the position therealong of the intersections of focus lines 124 and 128 therewith. Output 138 is used by computerized processing circuitry 140, preferably forming part of the data entry device 100, to calculate the distances of fingers 112 and 114 from optical element 116. Circuitry 140 preferably operates by locating the peaks 142 and 144 of the output signal 138, which correspond to detector element locations along detector 130. The detector element locations of the peaks 142 and 144 are directly mapped onto distances of the fingers 112 and 114 from optical element 116.

It is appreciated that non-focused light scattered by each of the fingers 112 and 114 is also received by detector 130 and creates a background signal. Conventional detection techniques which isolate signal peaks from background are preferably employed for eliminating inaccuracies which could otherwise result from the background signals.

Figure 2:
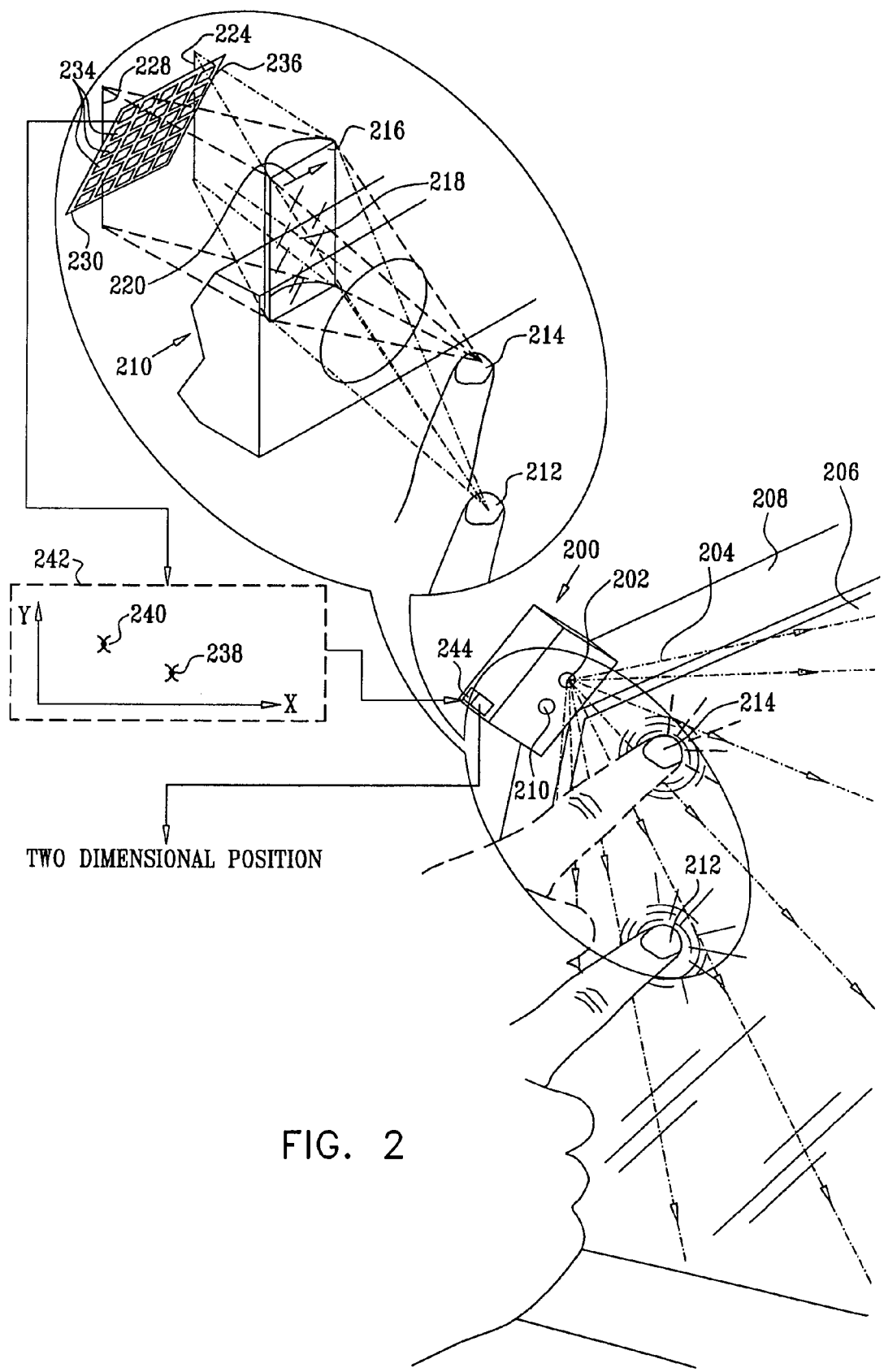
FIG. 2 is a simplified partially pictorial, partially diagrammatic illustration of a portion of a data entry device constructed and operative in accordance with another preferred embodiment of the present invention.

Reference is now made to FIG. 2, which is a simplified partially pictorial, partially diagrammatic illustration of a portion of a data entry device constructed and operative in accordance with another preferred embodiment of the present invention.

As seen in FIG. 2, there is provided a virtual data entry device, generally designated by reference numeral 200, and including an illuminator 202, generating a generally planar beam of light, generally designated by reference numeral 204. In the illustrated preferred embodiment of the invention, the generally planar beam of light 204 lies in spaced, generally parallel relationship to a generally planar surface 206 of a display 208, such as a LCD display.

An impingement sensor assembly 210 is operative to sense in two dimensions at least one location of impingement of the planar beam of light 204 by at least one object, such as a finger or a stylus. In the illustrated embodiment of FIG. 2, the planar beam of light 204 impinges on two fingers 212 and 214 which typically are touching display surface 206. The impingement sensor assembly 210 preferably includes at least one optical element, such as a cylindrical lens 216, having an optical axis 218 and arranged to receive light from planar beam 204 scattered or otherwise reflected by the fingers 212 and 214. Alternatively, a conical lens or a torroidal lens may be used.

Preferably, the optical element has optical power in a first direction 220, here parallel to display surface 206, thereby to focus light from finger 212 at a given focus line location 224, and to focus light from finger 214 at a given focus line location 228. The focus line locations 224 and 228 are each a function of the location of respective fingers 212 and 214, which scatter light from planar beam 204, from the optical element 216.

A multi-element detector, preferably a two-dimensional detector 230, such as a two-dimensional CMOS or CCD array commercially available from OmniVision Technologies Inc. of 1341 Orleans Drive, Sunnyvale, Calif., typically including 640×480 pixels, is arranged to receive light passing through the at least one optical element 216, wherein the distribution of light detected by the multi-element detector 230 indicates the location of each of fingers 212 and 214 relative to optical element 216.

It is a particular feature of the present invention that the multi-element detector 230 has multiple elements 234 arranged to lie in a detector plane 236 which is inclined with respect to focus lines 224 and 228 so as to intersect the focus lines 224 and 228, wherein the location of intersection of each of focus lines 224 and 228 with the detector plane 236 indicates the respective locations of fingers 212 and 214 relative to optical element 216. Specifically, as seen in FIG. 2, the Y location of each of signal peaks 238 and 240, which correspond to fingers 212 and 214 respectively, indicates the distance of the respective finger from optical element 216, while the X location of each of the signal peaks 238 and 240 indicates the azimuthal location of the respective finger relative to optical element 216.

Detector 230 provides an output image signal 242 which indicates the positions of fingers 212 and 214. Output image signal 242 is used by computerized processing circuitry 244, preferably forming part of the data entry device 200, to calculate the positions of fingers 212 and 214 with respect to optical element 216.

Figure 3:
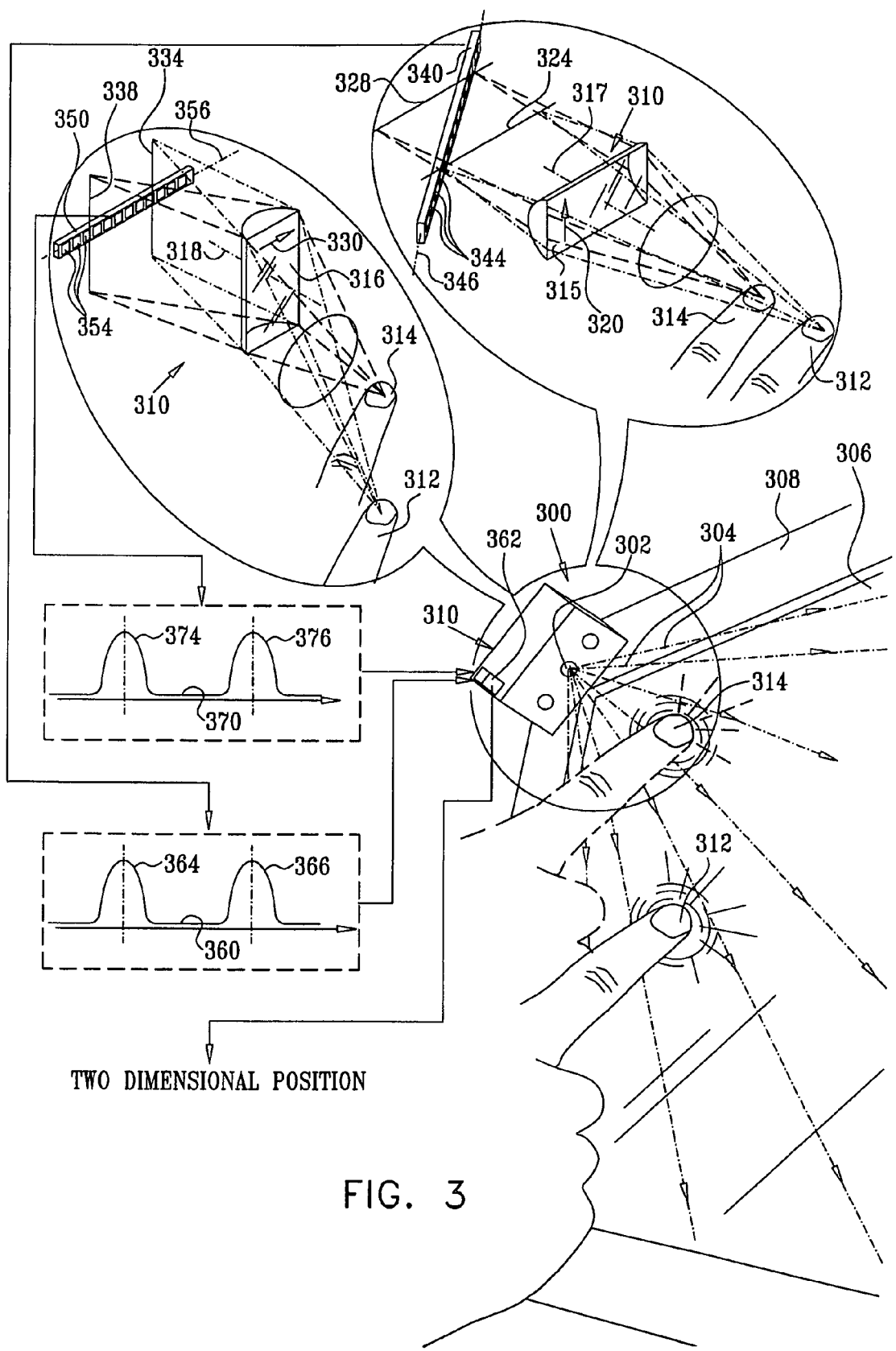
FIG. 3 is a simplified partially pictorial, partially diagrammatic illustration of a portion of a data entry device constructed and operative in accordance with yet another preferred embodiment of the present invention.

Reference is now made to FIG. 3, which is a simplified partially pictorial, partially diagrammatic illustration of a portion of a data entry device constructed and operative in accordance with yet another preferred embodiment of the present invention.

As seen in FIG. 3, there is provided a virtual data entry device, generally designated by reference numeral 300 and including an illuminator 302, generating a generally planar beam of light, generally designated by reference numeral 304. In the illustrated preferred embodiment of the invention, the generally planar beam of light 304 lies in spaced, generally parallel relationship to a generally planar surface 306 of a display 308, such as a LCD display.

An impingement sensor assembly 310 is operative to sense at least one location of impingement of the planar beam of light 304 by at least one object, such as a finger or a stylus. In the illustrated embodiment of FIG. 3, the planar beam of light 304 impinges on two fingers 312 and 314 which typically are touching display surface 306. The impingement sensor assembly 310 preferably includes at least two optical elements, such as cylindrical lenses 315 and 316, having respective optical axes 317 and 318 and arranged to receive light from planar beam 304 scattered or otherwise reflected by the fingers 312 and 314. Alternatively, one or both of cylindrical lenses 315 and 316 may be replaced by a conical lens or a torroidal lens.

Preferably, the optical element 315 has optical power in a first direction 320, here perpendicular to display surface 306, thereby to focus light from finger 312 at a given focus line location 324, and to focus light from finger 314 at a given focus line location 328. The focus line locations 324 and 328 are each a function of the distance of respective fingers 312 and 314, which scatter light from planar beam 304, from the optical element 315.

Preferably, the optical element 316 has optical power in a second direction 330, here parallel to display surface 306, thereby to focus light from finger 312 at a given focus line location 334, and to focus light from finger 314 at a given focus line location 338. The focus line locations 334 and 338 are each a function of the azimuthal location of respective fingers 312 and 314, which scatter light from planar beam 304, relative to the optical element 316.

A multi-element detector, preferably a one-dimensional detector 340, such as a linear CMOS or CCD array commercially available from Panavision LTD. of 6219 De Soto Avenue, Woodland Hills, Calif., typically including 2048 pixels arranged along a straight line wherein each pixel is generally square, is preferably inclined with respect to optical element 315 and is arranged to receive light passing through the at least one optical element 315, wherein the distribution of light, detected by the multi-element detector 340, indicates the distance of each of fingers 312 and 314 from optical element 315.

It is a particular feature of the present invention that the multi-element detector 340 has multiple elements 344 arranged side-by-side along a detector line 346 which intersects the focus lines 324 and 328, wherein the location of intersection of each of focus lines 324 and 328 with the detector line 346 indicates the respective distances of fingers 312 and 314 from the optical element 315.

It is appreciated that non-focused light scattered by each of the fingers 312 and 314 is also received by detector 340 and creates a background signal. Conventional detection techniques which isolate signal peaks from background are preferably employed for eliminating inaccuracies which could otherwise result from the background signals.

Impingement sensor assembly 300 includes, in addition to multi-element detector 340, an additional multi-element detector, which is preferably a one-dimensional detector 350, such as a linear CMOS or CCD array commercially available from Panavision LTD. of 6219 De Soto Avenue, Woodland Hills, Calif., typically including 2048 pixels arranged along a straight line. Detector 350 is arranged to receive light passing through optical element 316, wherein the distribution of light, detected by the multi-element detector 350, indicates the azimuthal location of each of fingers 312 and 314 relative to optical element 316.

It is a particular feature of the present invention that the multi-element detector 350 has multiple elements 354 arranged side-by-side along a detector line 356 which intersects the focus lines 334 and 338, wherein the location of intersection of each of focus lines 334 and 338 with the detector line 356 indicates the respective azimuthal locations of fingers 312 and 314 relative to optical element 316.

Detector 340 provides an output signal 360 which indicates the position therealong of the intersections of focus lines 324 and 328 therewith. Output signal 360 is used by computerized processing circuitry 362, preferably forming part of the data entry device 300, to calculate the distances of fingers 312 and 314 from optical element 315. Circuitry 362 preferably operates by locating peaks 364 and 366 of the output signal 360, which correspond to detector element locations along detector 340. The detector element locations of the peaks 364 and 366 are directly mapped by processing circuitry 362 onto distances of the fingers 312 and 314 from optical element 315.

Detector 350 provides an output signal 370 which indicates the position therealong of the intersections of focus lines 334 and 338 therewith. Output signal 370 is used by computerized processing circuitry 362 to calculate the azimuthal locations of fingers 312 and 314 relative to optical element 316. Circuitry 362 preferably operates by locating peaks 374 and 376 of the output signal 370, which correspond to detector element locations along detector 350. The detector element locations of the peaks 374 and 376 are directly mapped by processing circuitry 362 onto azimuthal locations of the fingers 312 and 314 from optical element 316. Circuitry 362 preferably maps the distances and azimuthal locations of the fingers 312 and 314 onto Cartesian coordinate expressions of the two-dimensional positions of the fingers.

Figure 4:
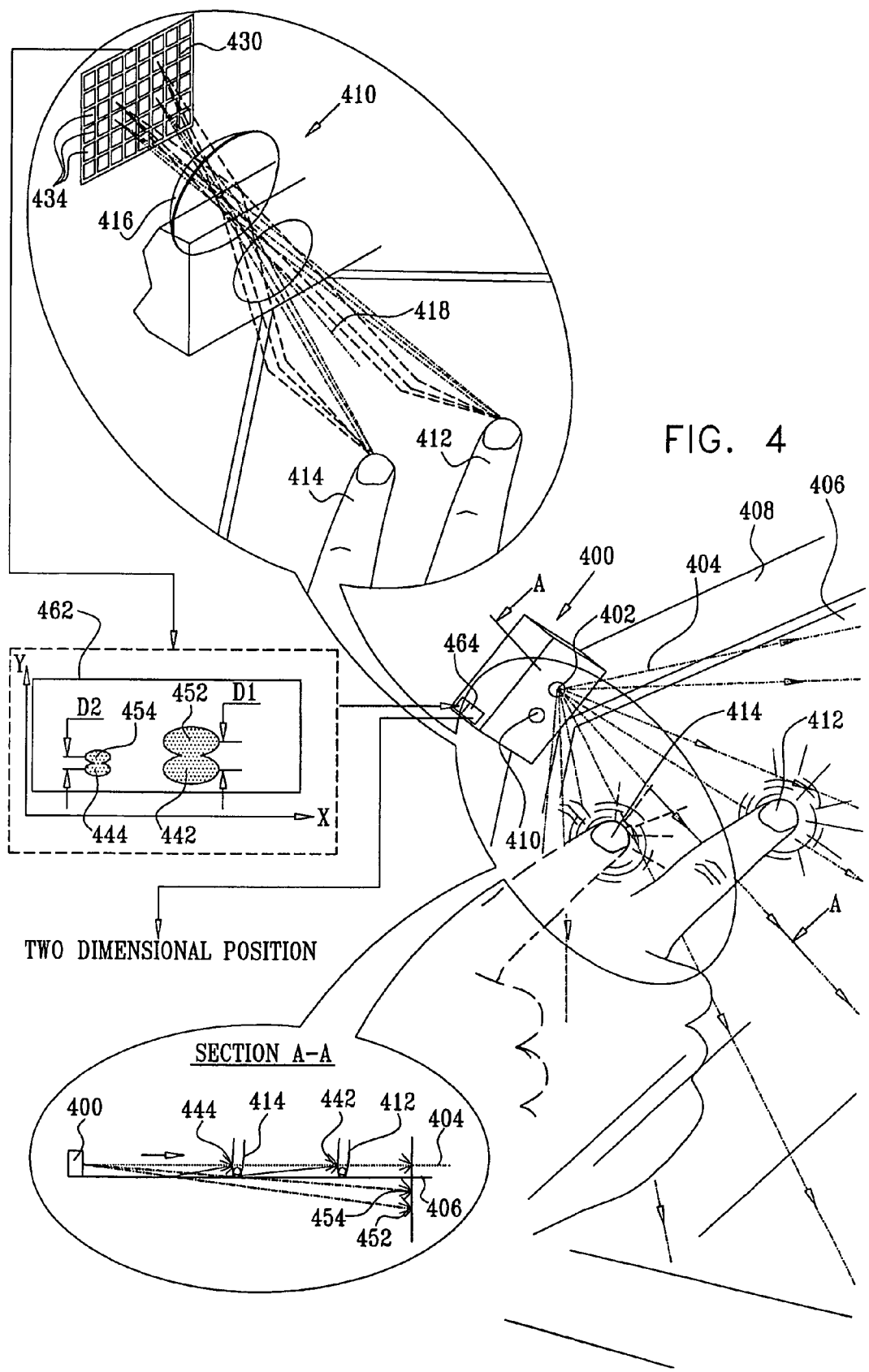
FIG. 4 is a simplified partially pictorial, partially diagrammatic illustration of a portion of a data entry device constructed and operative in accordance with still another preferred embodiment of the present invention.

Reference is now made to FIG. 4, which is a simplified partially pictorial, partially diagrammatic illustration of a portion of a data entry device constructed and operative in accordance with still another preferred embodiment of the present invention.

As seen in FIG. 4, there is provided a virtual data entry device, generally designated by reference numeral 400, and including an illuminator 402, generating a generally planar beam of light, generally designated by reference numeral 404. In the illustrated preferred embodiment of the invention, the generally planar beam of light 404 lies in spaced, generally parallel relationship to a generally planar, at least partially reflective surface 406, such as a surface of a display 408, such as a LCD display.

An impingement sensor assembly 410 is operative to sense in two dimensions at least one location of impingement of the planar beam of light 404 by at least one object, such as a finger or a stylus. In the illustrated embodiment of FIG. 4, the planar beam of light 404 impinges on two fingers 412 and 414 which typically are touching surface 406. The impingement sensor assembly 410 preferably includes at least one optical element, such as a lens 416, having an optical axis 418 and arranged to receive light from planar beam 404 scattered or otherwise reflected by the fingers. Lens 416 is preferably arranged to receive light from the planar beam 404 which is reflected by fingers 412 and 414 directly as well as indirectly via at least partially reflecting surface 406.

A multi-element detector, preferably a two-dimensional detector 430, such as a two-dimensional CMOS or CCD array commercially available from OmniVision Technologies Inc. of 1341 Orleans Drive, Sunnyvale, Calif., typically including 640×480 pixels, is arranged to receive light passing through the at least one optical element 416, wherein the distribution of light, detected by the multi-element detector 430 indicates the location of each of fingers 412 and 414 relative to optical element 416.

It is a particular feature of the present invention that the multi-element detector 430, which has multiple elements 434 arranged to lie in an image plane of optical element 416, receives light via optical element 416 from the planar beam 404 which is reflected by fingers 412 and 414 directly as well as indirectly via at least partially reflecting surface 406. The respective spatial separations D1 and D2 on detector 430 of impingements 442 and 444 of light which is reflected directly from fingers 412 and 414 and impingements 452 and 454 of light which is reflected via at least partially reflecting surface 406 indicate distances of the fingers 412 and 414 from optical element 416. The respective X locations of impingements 442 and 444 on detector 430 indicate the azimuthal locations of fingers 412 and 414 relative to optical element 416.

Detector 430 provides an output image signal 462 which indicates the positions of fingers 412 and 414. Output image signal 462 is used by computerized processing circuitry 464, preferably forming part of the data entry device 400, to calculate the two-dimensional positions of fingers 412 and 414 in Cartesian coordinates.

Figure 5:
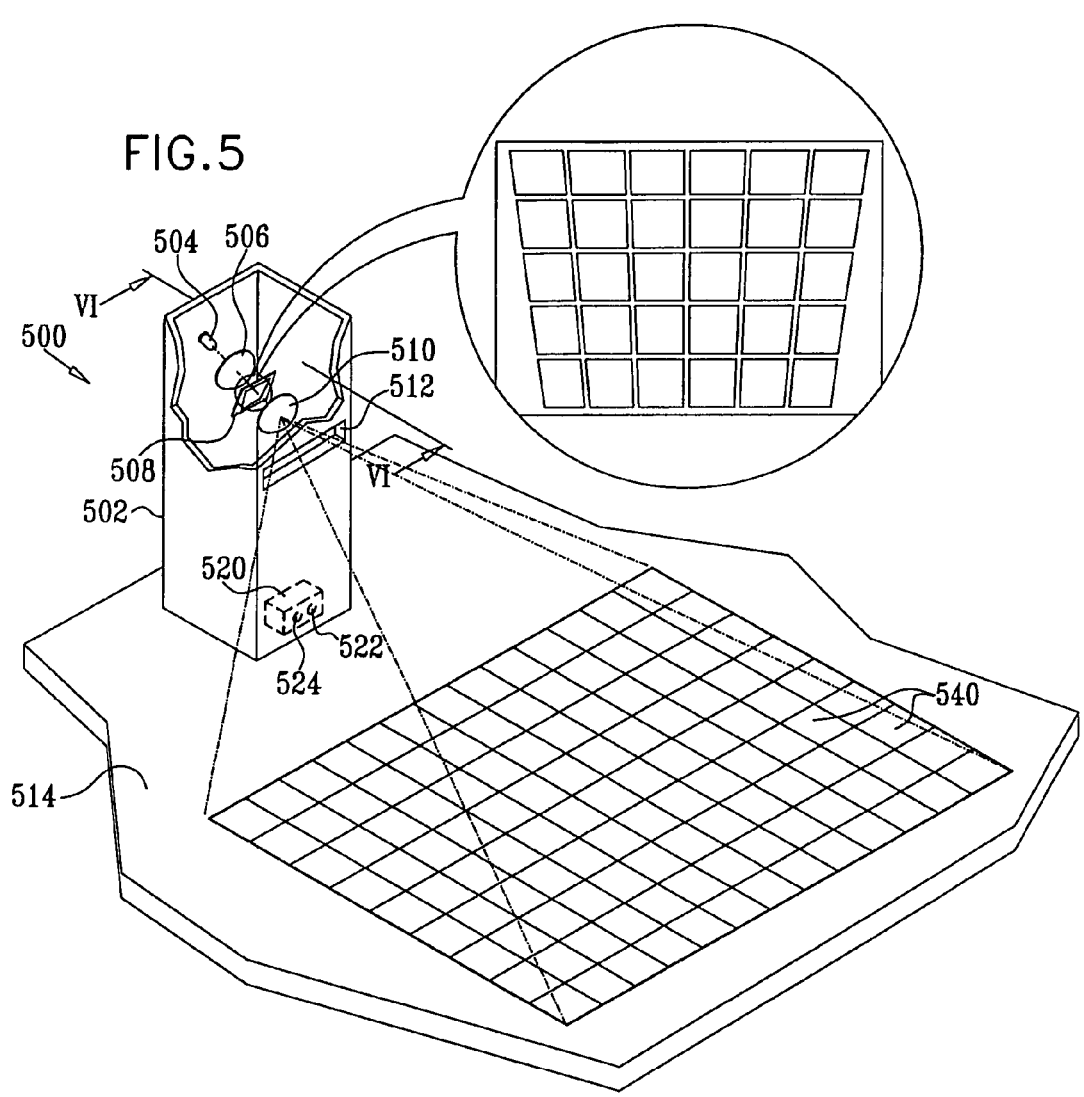
FIG. 5 is a simplified partially pictorial, partially diagrammatic illustration of a portion of a projection device constructed and operative in accordance with yet another preferred embodiment of the present invention.
Figure 6:
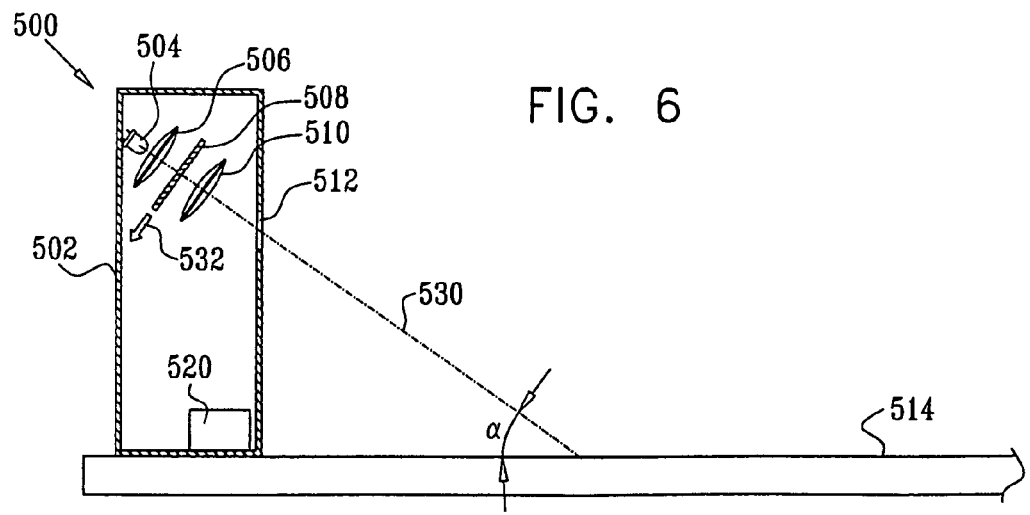
FIG. 6 is a sectional illustration of the projection device of FIG. 5, taken along lines VI-VI in FIG. 5.

Reference is now made to FIG. 5, which is a simplified partially pictorial, partially diagrammatic illustration of a portion of a projection device constructed and operative in accordance with yet another preferred embodiment of the present invention and to FIG. 6, which is a sectional illustration of the projection device of FIG. 5, taken along section lines VI-VI in FIG. 5.

As seen in FIGS. 5 and 6, there is provided a projection device, which optionally has the functionality of a virtual data entry device and is generally designated by reference numeral 500. The projector preferably comprises a housing 502, in which there is provided a light source 504, such as an LED. Downstream of the light source 504 there is preferably provided collimating optics such as a condensing lens 506.

Downstream of condensing lens 506 there is preferably provided a spatial light modulator 508, such as a matrix LCD. Downstream of spatial light modulator 508 there is preferably provided projection optics, such as a projection lens 510. Preferably, the projection lens 510 projects light from the light source 504, via a projection window 512 formed in housing 502 onto a projection surface 514.

Optionally, impingement-sensing functionality may be combined with the projector described hereinabove. As seen in FIGS. 5 and 6, an impingement sensor 520 is mounted on or located within housing 502. Impingement sensor 520 is preferably of the type described hereinabove with reference to any of FIGS. 1-4. Preferably, impingement sensor 520 includes an illuminator 522, generating a generally planar beam of light which lies in spaced, generally parallel relationship to projection surface 514, and a sensor assembly 524, which is operative to sense the distance of at least one location of impingement of the planar beam of light by at least one object, such as a finger or a stylus.

Preferably, the angular and positional relationships of the various components of the projector are as follows: generally light is being projected in a direction generally indicated by a line 530 in FIG. 6, at an acute angle alpha ( ) with respect to the projection surface 514. Condensing lens 506 is aligned generally along an optical axis of light source 504. The spatial light modulator 508 and the projecting lens 510 are arranged with respect to the plane of the projection surface 514 and with respect to the optical axis of the light source and condensing lens in accordance with the Scheimpflug principle, i.e. that the plane of the spatial light modulator is focused onto the projection surface, which is obliquely angled with respect to the optical axis of the light source and condensing lens. The spatial light modulator 508 is preferably offset in a direction indicated by an arrow 532 in order to optimize uniformity of projection intensity.

It is a particular feature of the present invention that the spatial light modulator 508 is configured to compensate for keystone distortions which result from projection therethrough onto projection surface 514. In accordance with a preferred embodiment of the present invention, the size and shape of each pixel of the spatial light modulator 508 is distorted appropriately to provide a projected image 540 on projection surface 514, in which each pixel is of the same size and shape.

Preferably, each pixel in the projected image is generally rectangular as shown, while each pixel in the spatial light modulator has generally parallel top and bottom edges with non-mutually parallel side edges as shown in the enlarged portion of FIG. 5. Normally, the pixels in the spatial light modulator are of differing sizes and the pixels towards the bottom of the spatial light modulator, which are projected a longer distance and at a more oblique angle are smaller than those at the top of the spatial light modulator, which are projected a shorter distance and at a less oblique angle.

Preferably, the spatial light modulator 508 is offset with respect to the condensing lens 506, such that more light per unit area is directed through the smaller pixels of the spatial light modulator 508 so as to enhance uniformity of light intensity over the pixels in the projected image 540.

Figure 7:
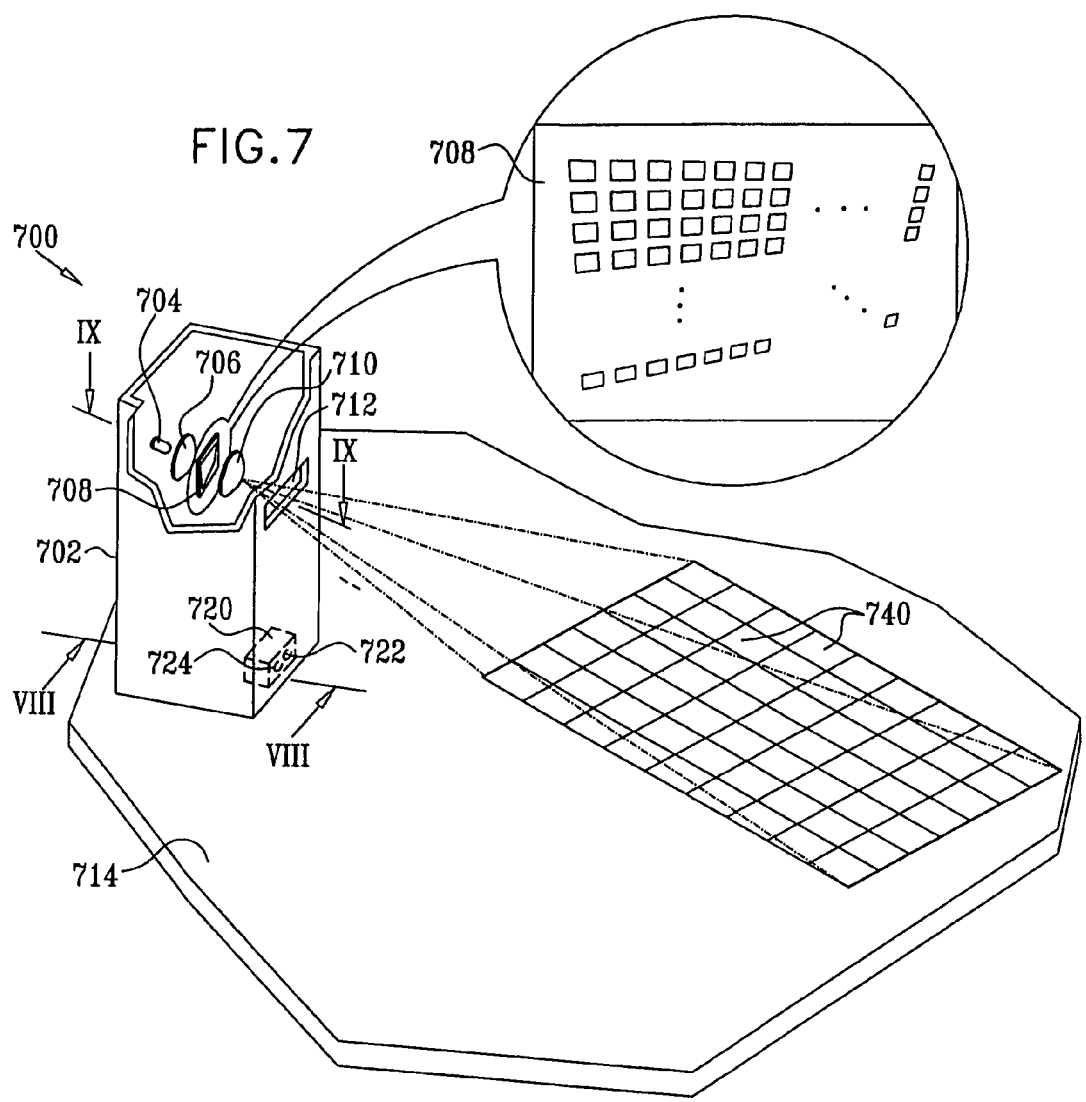
FIG. 7 is a simplified partially pictorial, partially diagrammatic illustration of a portion of a projection device constructed and operative in accordance with a further preferred embodiment of the present invention.
Figure 8:
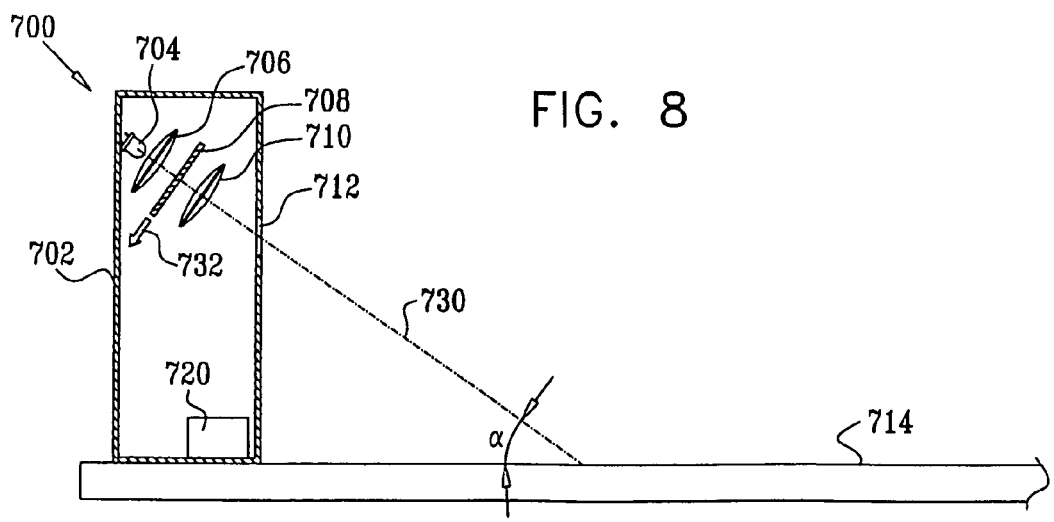
FIG. 8 is a sectional illustration of the projection device of FIG. 7, taken along lines VIII-VIII in FIG. 7.
Figure 9:
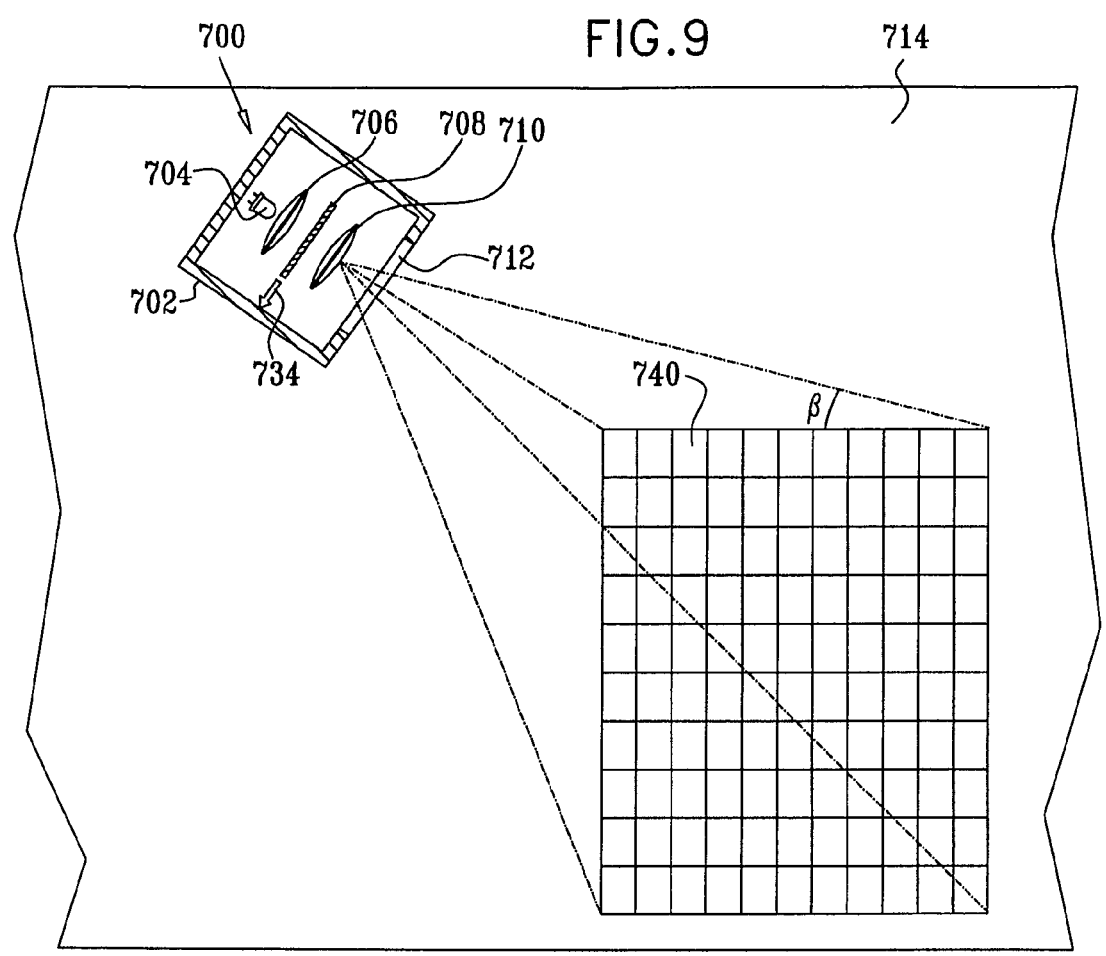
FIG. 9 is a sectional illustration of the projection device of FIG. 7, taken along lines IX-IX in FIG. 7.

Reference is now made to FIG. 7, which is a simplified partially pictorial, partially diagrammatic illustration of a portion of a projection device constructed and operative in accordance with a further preferred embodiment of the present invention, to FIG. 8, which is a sectional illustration of the projection device of FIG. 7, taken along lines VIII-VIII in FIG. 7 and to FIG. 9, which is a sectional illustration of the projection device of FIG. 7, taken along section lines IX-IX in FIG. 7.

As seen in FIGS. 7-9, there is provided a projection device, which optionally has the functionality of a virtual data entry device and is generally designated by reference numeral 700. The projector preferably comprises a housing 702, in which there is provided a light source 704, such as an LED. Downstream of the light source 704 there is preferably provided collimating optics such as a condensing lens 706.

Downstream of condensing lens 706 there is preferably provided a spatial light modulator 708, such as a matrix LCD. Downstream of spatial light modulator 708 there is preferably provided projection optics, such as a projection lens 710. Preferably, the projection lens 710 projects light from the light source 704, via a projection window 712 formed in housing 702 onto a projection surface 714.

Optionally, impingement-sensing functionality may be combined with the projector described hereinabove. As seen in FIGS. 7-9, an impingement sensor 720 is mounted on or located within housing 702. Impingement sensor 720 is preferably of the type described hereinabove with reference to any of FIGS. 1-4. Preferably, impingement sensor 720 includes an illuminator 722, generating a generally planar beam of light which lies in spaced, generally parallel relationship to projection surface 714, and a sensor assembly 724, which is operative to sense the distance of at least one location of impingement of the planar beam of light by at least one object, such as a finger or a stylus.

The embodiment of FIGS. 7-9 is distinguished from that of FIGS. 5 and 6 in that whereas the embodiment of FIGS. 5 and 6 provides oblique projection along one axis of the projection surface 514, the embodiment of FIGS. 7-9 provides oblique projection along two axes of the projection surface 714.

Accordingly, the angular and positional relationships of the various components of the projector preferably are as follows: generally light is being projected in a direction generally indicated by a line 730 in FIGS. 8 and 9, at respective acute angles alpha ( ) and beta ( ) with respect to the projection surface 714. Condensing lens 706 is aligned generally along an optical axis of light source 704. The spatial light modulator 708 and the projecting lens 710 are arranged with respect to the plane of the projection surface 714 and with respect to the optical axis of the light source and condensing lens in accordance with the Scheimpflug principle, i.e. that the plane of the spatial light modulator is focused onto the projection surface, which is obliquely angled with respect to the optical axis of the light source and condensing lens. The spatial light modulator 708 is preferably offset in directions indicated by an arrow 732 (FIG. 8) and by an arrow 734 (FIG. 9) in order to optimize uniformity of projection intensity.

It is a particular feature of the present invention that the spatial light modulator 708 is configured to compensate for geometrical distortions which result from projection therethrough onto projection surface 714. These distortions include keystone distortions along two mutually perpendicular axes as well as possible other optical distortions. In accordance with a preferred embodiment of the present invention, the size and shape of each pixel of the spatial light modulator 708 is distorted appropriately to provide a projected image 740 on projection surface 714, in which each pixel is of the same size and shape.

Preferably, each pixel in the projected image is generally rectangular as shown, while each pixel in the spatial light modulator has non-mutually parallel side edges. Normally, the pixels in the spatial light modulator are of differing sizes and the pixels towards the bottom right corner of the spatial light modulator (as seen in FIG. 7), which are projected a longer distance and at a more oblique angle are smaller than those at the top left corner of the spatial light modulator, which are projected a shorter distance and at a less oblique angle.

Preferably, the spatial light modulator 708 is offset with respect to the condensing lens 706, such that more light per unit area is directed through the smaller pixels of the spatial light modulator 708 so as to enhance uniformity of light intensity over the pixels in the projected image 740.

Figure 10:
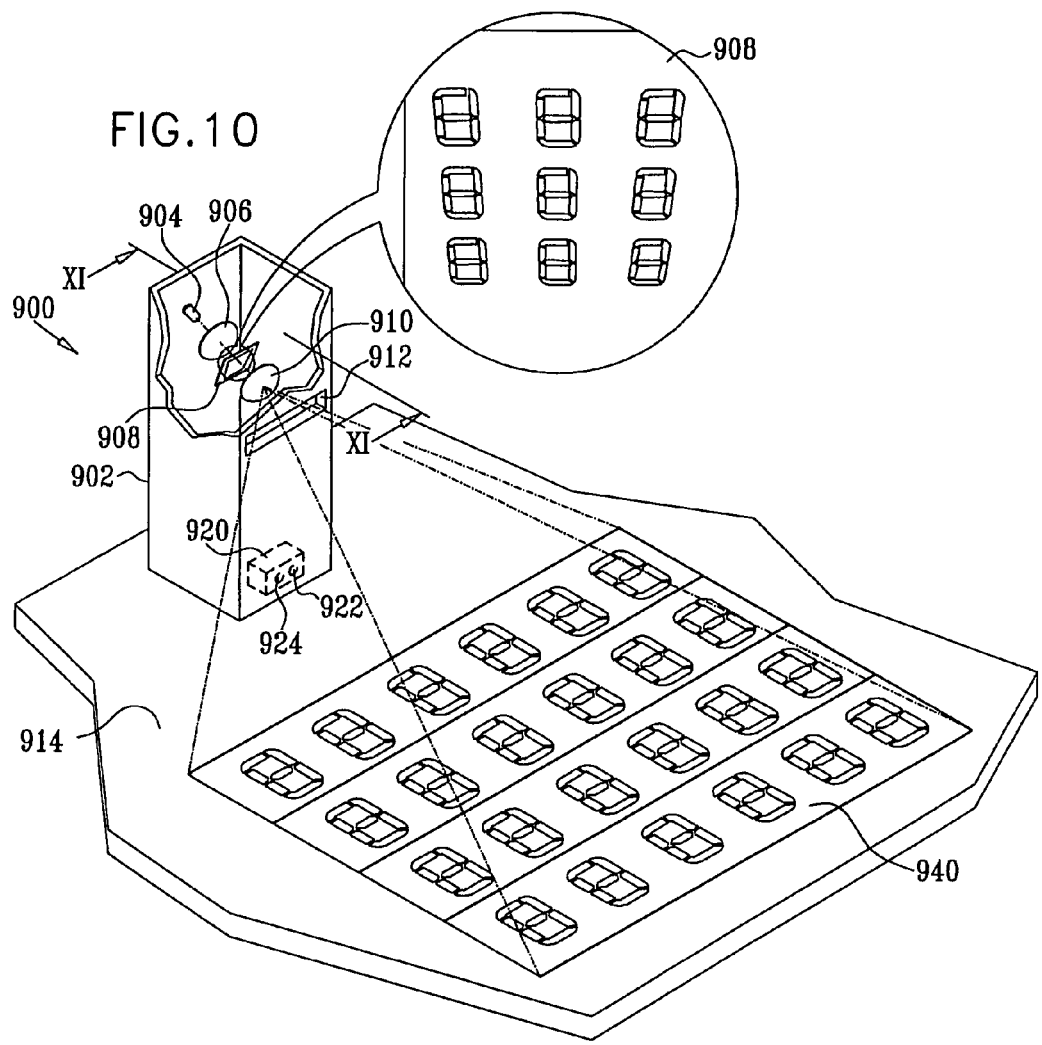
FIG. 10 is a simplified partially pictorial, partially diagrammatic illustration of a portion of a projection device constructed and operative in accordance with yet a further preferred embodiment of the present invention.
Figure 11:
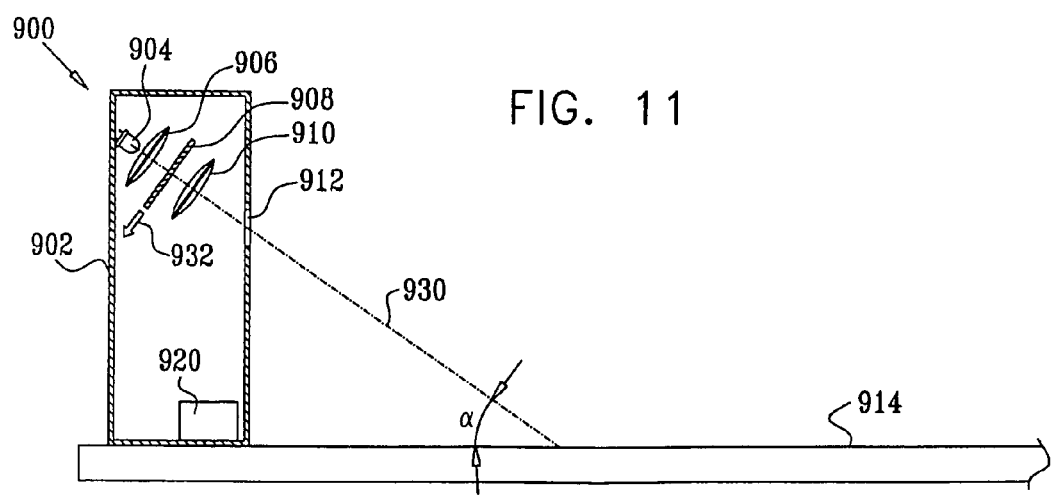
FIG. 11 is a sectional illustration of the projection device of FIG. 10, taken along lines XI-XI in FIG. 10.

Reference is now made to FIG. 10, which is a simplified partially pictorial, partially diagrammatic illustration of a portion of a projection device constructed and operative in accordance with yet a further preferred embodiment of the present invention and to FIG. 11, which is a sectional illustration of the projection device of FIG. 10, taken along section lines XI-XI in FIG. 10.

As seen in FIGS. 10 and 11, there is provided a projection device, which optionally has the functionality of a virtual data entry device and is generally designated by reference numeral 900. The projector preferably comprises a housing 902, in which there is provided a light source 904, such as an LED. Downstream of the light source 904 there is preferably provided collimating optics such as a condensing lens 906.

Downstream of condensing lens 906 there is preferably provided a spatial light modulator 908, such as a segmented LCD. Downstream of spatial light modulator 908 there is preferably provided projection optics, such as a projection lens 910. Preferably, the projection lens 910 projects light from the light source 904, via a projection window 912 formed in housing 902 onto a projection surface 914.

Optionally, impingement-sensing functionality may be combined with the projector described hereinabove. As seen in FIGS. 10 and 11, an impingement sensor 920 is mounted on or located within housing 902. Impingement sensor 920 is preferably of the type described hereinabove with reference to any of FIGS. 1-4. Preferably, impingement sensor 920 includes an illuminator 922, generating a generally planar beam of light which lies in spaced, generally parallel relationship to projection surface 914, and a sensor assembly 924, which is operative to sense the distance of at least one location of impingement of the planar beam of light by at least one object, such as a finger or a stylus.

Preferably, the angular and positional relationships of the various components of the projector are as follows: generally light is being projected in a direction generally indicated by a line 930 in FIG. 11, at an acute angle alpha ( ) with respect to the projection surface 914. Condensing lens 906 is aligned generally along an optical axis of light source 904. The spatial light modulator 908 and the projecting lens 910 are arranged with respect to the plane of the projection surface 914 and with respect to the optical axis of the light source and condensing lens in accordance with the Scheimpflug principle, i.e. that the plane of the spatial light modulator is focused onto the projection surface, which is obliquely angled with respect to the optical axis of the light source and condensing lens. The spatial light modulator 908 is preferably offset in a direction indicated by an arrow 932 in order to optimize uniformity of projection intensity.

It is a particular feature of the present invention that the spatial light modulator 908 is configured to compensate for keystone distortions which result from projection therethrough onto projection surface 914. In accordance with a preferred embodiment of the present invention, the size and shape of each segment of the spatial light modulator 908 is distorted appropriately to provide a projected image 940 on projection surface 914, in which each pixel is of the same size and shape.

Preferably, the segments in the spatial light modulator are of differing sizes and the segments towards the bottom of the spatial light modulator, which are projected a longer distance and at a more oblique angle, are smaller than those at the top of the spatial light modulator, which are projected a shorter distance and at a less oblique angle.

Preferably, the spatial light modulator 908 is offset with respect to the condensing lens 906, such that more light per unit area is directed through the smaller segments of the spatial light modulator 908 so as to enhance uniformity of light intensity over the segments in the projected image 940.

It is appreciated that a modification of the segmented spatial light modulator of FIGS. 10 and 11 for oblique projection in two directions can be carried out in accordance with the above description of FIGS. 7-9.

It will be appreciated by persons skilled in the art that the present invention is not limited by what has been particularly shown and described hereinabove. Rather the scope of the present invention includes combinations and subcombinations of various features of the present invention as well as modifications which would occur to persons reading the foregoing description and which are not in the prior art.

The invention claimed is:

1. A pattern projector comprising:
a source of light to be projected;
a spatial light modulator arranged in a spatial light modulator plane, said spatial light modulator receiving said light from said source of light and being configured to pass said light therethrough in a first pattern; and
projection optics receiving said light from said spatial light modulator and being operative to project a desired second pattern onto a projection surface lying in a projection surface plane which is angled with respect to said spatial light modulator plane,
said first pattern being a distortion of said desired second pattern configured such that keystone distortions resulting from the difference in angular orientations of said spatial light modulator plane and said projection surface plane are compensated, and
said spatial light modulator comprising a matrix LCD and including a plurality of pixels, different ones of said plurality of pixels of said spatial light modulator having at least one of different sizes and different shapes.

2. A pattern projector according to claim 1 and also comprising a collimator interposed between said source of light and said spatial light modulator, said collimator being operative to distribute said light from said source of light across said spatial light modulator in a non-uniform distribution such that light distribution in said desired second pattern has uniformity greater than said non-uniform distribution.

3. A pattern projector according to claim 1 and wherein said spatial light modulator plane is angled with respect to said projection optics such that said desired second pattern is focused to a generally uniform extent.

4. A pattern projector comprising:
a source of light to be projected;
a spatial light modulator arranged in a spatial light modulator plane, said spatial light modulator receiving said light from said source of light and being configured to pass said light therethrough in a first pattern; and
projection optics receiving said light from said spatial light modulator and being operative to project a desired second pattern onto a projection surface lying in a projection surface plane which is angled with respect to said spatial light modulator plane,
said first pattern being a distortion of said desired second pattern configured such that keystone distortions resulting from the difference in angular orientations of said spatial light modulator plane and said projection surface plane are compensated, and
said spatial light modulator comprising a segmented LCD including a plurality of segments, different ones of said plurality of segments of said spatial light modulator having at least one of different sizes and different shapes.

5. A pattern projector according to claim 4 and also comprising a collimator interposed between said source of light and said spatial light modulator, said collimator being operative to distribute said light from said source of light across said spatial light modulator in a non-uniform distribution such that light distribution in said desired second pattern has uniformity greater than said non-uniform distribution.

6. A pattern projector according to claim 4 and wherein said spatial light modulator plane is angled with respect to said projection optics such that said desired second pattern is focused to a generally uniform extent.

7. A method for projecting a pattern comprising:
providing a source of light to be projected;
arranging a spatial light modulator, in a spatial light modulator plane, to receive said light from said source of light, said spatial light modulator being configured to pass said light therethrough in a first pattern; and
using projection optics for receiving said light from said spatial light modulator and for projecting a desired second pattern onto a projection surface lying in a projection surface plane which is angled with respect to said spatial light modulator plane,
said first pattern being a distortion of said desired second pattern configured such that keystone distortions resulting from the difference in angular orientations of said spatial light modulator plane and said projection surface plane are compensated, and
said arranging said spatial light modulator including providing a spatial light modulator including a plurality of pixels, different ones of said plurality of pixels having at least one of different sizes and different shapes.

8. A method for projecting a pattern according to claim 7 and also comprising providing a collimator interposed between said source of light and said spatial light modulator, and utilizing said collimator to distribute said light from said source of light across said spatial light modulator in a non-uniform distribution such that light distribution in said desired second pattern has uniformity greater than said non-uniform distribution.

9. A method for projecting a pattern according to claim 7 and wherein said arranging said spatial light modulator includes angling said spatial light modulator plane with respect to said projection optics such that said desired second pattern is focused to a generally uniform extent.

10. A method for projecting a pattern comprising:
providing a source of light to be projected;
arranging a spatial light modulator, in a spatial light modulator plane, to receive said light from said source of light, said spatial light modulator being configured to pass said light therethrough in a first pattern; and
using projection optics for receiving said light from said spatial light modulator and for projecting a desired second pattern onto a projection surface lying in a projection surface plane which is angled with respect to said spatial light modulator plane,
said first pattern being a distortion of said desired second pattern configured such that keystone distortions resulting from the difference in angular orientations of said spatial light modulator plane and said projection surface plane are compensated, and
said arranging said spatial light modulator including providing a segmented LCD including a plurality of segments, different ones of said plurality of segments having at least one of different sizes and different shapes.

11. A method for projecting a pattern according to claim 10 and also comprising providing a collimator interposed between said source of light and said spatial light modulator, and utilizing said collimator to distribute said light from said source of light across said spatial light modulator in a non-uniform distribution such that light distribution in said desired second pattern has uniformity greater than said non-uniform distribution.

12. A method for projecting a pattern according to claim 10 and wherein said arranging said spatial light modulator includes angling said spatial light modulator plane with respect to said projection optics such that said desired second pattern is focused to a generally uniform extent.

* * * * *